(12) United States Patent
Johnson et al.

(10) Patent No.: US 11,352,978 B2
(45) Date of Patent: Jun. 7, 2022

(54) DEFLECTABLE DISTRIBUTED AEROSPIKE ROCKET NOZZLE

(71) Applicant: Raytheon Company, Waltham, MA (US)

(72) Inventors: Daniel K. Johnson, Tucson, AZ (US); Derek J. Dulin, Tucson, AZ (US); Scott A. Felt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/910,394

(22) Filed: Jun. 24, 2020

(65) Prior Publication Data
US 2021/0404415 A1    Dec. 30, 2021

(51) Int. Cl.
*F02K 1/40*    (2006.01)
*F02K 1/00*    (2006.01)

(52) U.S. Cl.
CPC ............. *F02K 1/002* (2013.01); *F02K 1/40* (2013.01)

(58) Field of Classification Search
CPC ... F02K 1/06; F02K 1/002; F02K 1/40; F02K 1/42; F02K 9/80; F02K 9/84; F02K 9/90; F02K 9/97; F02K 9/978
See application file for complete search history.

(56) References Cited

U.S. PATENT DOCUMENTS

| | | | | |
|---|---|---|---|---|
| 2,664,700 | A  * | 1/1954 | Benoit | F02K 1/48 239/265.25 |
| 3,040,523 | A  * | 6/1962 | Price | F02K 1/006 239/265.25 |
| 6,622,472 | B2 | 9/2003 | Plumpe, Jr. | |
| 7,478,778 | B2 | 1/2009 | Erland | |
| 7,900,460 | B2 | 3/2011 | Melker | |
| 8,268,438 | B2 | 9/2012 | Friess | |
| 8,347,633 | B2 | 1/2013 | Smith | |
| 2011/0083418 | A1 * | 4/2011 | Ciezki | F42B 10/665 60/230 |
| 2015/0354501 | A1 | 12/2015 | Florea | |
| 2019/0063372 | A1 * | 2/2019 | Robinson | F02K 9/97 |

* cited by examiner

*Primary Examiner* — Gerald L Sung
(74) *Attorney, Agent, or Firm* — Renner, Otto, Boisselle & Sklar, LLP

(57) ABSTRACT

A rocket engine nozzle includes an aerospike having a plurality of adjustable airfoil vanes distributed around a central longitudinal axis of a rocket engine combustion chamber. The aerospike is integrated on an exit plane at an exit end of the combustion chamber. The adjustable airfoil vanes and an inner perimeter of the combustion chamber define a plurality of apertures which choke an exhaust exiting the combustion chamber and cause the exhaust to expand supersonically along the adjustable airfoil vanes, creating a supersonic jet. An actuator is configured to adjust a position of each of the adjustable airfoil vane relative to each other so as to direct the exhaust exiting the rocket engine combustion chamber as the exhaust expands supersonically over the airfoil vanes without causing a shockwave to be imparted on the supersonic jet that is created. Accordingly, performance of the rocket engine is improved over conventional systems.

19 Claims, 5 Drawing Sheets

DEFLECTABLE DISTRIBUTED AEROSPIKE ROCKET NOZZLE

TECHNICAL FIELD

The present invention relates generally to rocket propulsion systems and more particularly to thrust vectoring in rocket propulsion systems.

BACKGROUND

Jet vane control technology is used in (for example) tactical missile systems to vector the thrust of a supersonic jet. Typically, jet vanes are placed in the path of a supersonic jet in (or exiting) a rocket engine nozzle and are configured to vector the thrust that is produced by the supersonic jet. Although these systems are effective at increasing the maneuverability of the missile, they often add significant length to a missile and involve significant cost, design and performance loss challenges. For example, when the jet vanes divert the supersonic jet, a strong oblique shockwave is typically imparted on the supersonic jet, which can reduce thrust efficiency and overall rocket motor performance in excess of 15%, typically between 10-20%. Additionally, the actuation systems that support and drive the jet vanes are subject to significant bending moment due to the fact that they are cantilevered over the supersonic jet.

SUMMARY

In a general embodiment, a deflectable distributed aerospike rocket engine nozzle includes an aerospike having at least one adjustable airfoil vane distributed at an exit end of a rocket engine blast tube or combustion chamber. The aerospike may have, for example, a plurality of adjustable airfoil vanes distributed around a central longitudinal axis of the rocket engine combustion chamber. The aerospike is integrated on an exit plane at the exit end of the combustion chamber. The adjustable airfoil vanes and an inner perimeter of the combustion chamber define a plurality of apertures which choke an exhaust exiting the combustion chamber and cause the exhaust to expand supersonically along the adjustable airfoil vanes. An actuator is configured to adjust a position of each of the adjustable airfoil vanes relative to each other so as to direct the exhaust exiting the rocket engine combustion chamber before it expands supersonically across the airfoil vanes. In this manner, the rocket engine nozzle directs the supersonic jet that is created and effectively vectors a thrust of the supersonic jet without any oblique shockwave being imparted on the supersonic jet.

According to an aspect of the invention, a rocket engine nozzle includes an aerospike including a plurality of adjustable airfoil vanes disposed at an exit end of a rocket engine combustion chamber and extending across an exit plane of the rocket engine combustion chamber. The plurality of adjustable airfoil vanes are distributed around a central longitudinal axis. The plurality of adjustable airfoil vanes and an inner perimeter of the rocket engine combustion chamber define a plurality of apertures between adjacent adjustable airfoil vanes at the exit plane. The plurality of apertures are configured to choke an exhaust exiting the rocket engine combustion chamber and cause the exhaust to expand supersonically along the plurality of adjustable airfoil vanes to create a supersonic jet. The rocket engine nozzle also includes an actuator configured to adjust a position of the plurality of adjustable airfoil vanes relative to each other to thereby direct the exhaust exiting the rocket engine combustion chamber as it expands supersonically along the plurality of adjustable airfoil vanes to thereby direct the supersonic jet and vector a thrust of the supersonic jet.

According to an embodiment of any paragraph(s) of this summary, the actuator is configured to rotate one or more of the plurality of adjustable airfoil vanes around a respective radial axis on which the one or more adjustable airfoil vane is positioned.

According to another embodiment of any paragraph(s) of this summary, the actuator includes one or more actuation hinges.

According to another embodiment of any paragraph(s) of this summary, the actuator is configured to translate one or more of the plurality of adjustable airfoil vanes linearly along a respective oblique axis. The respective oblique axis is perpendicular to a respective radial axis on which the one or more adjustable airfoil vane is positioned.

According to another embodiment of any paragraph(s) of this summary, the actuator includes one or more linear actuators.

According to another embodiment of any paragraph(s) of this summary, the plurality of adjustable airfoil vanes include four adjustable airfoil vanes.

According to another embodiment of any paragraph(s) of this summary, the actuator is configured to adjust each of the plurality of adjustable airfoil vanes independently from each other.

According to another embodiment of any paragraph(s) of this summary, the actuator is configured to adjust one or more of the plurality of airfoil vanes in a coordinated manner.

According to another aspect of the invention, a rocket engine includes a rocket engine combustion chamber and a rocket engine nozzle. The rocket engine nozzle includes an aerospike including a plurality of adjustable airfoil vanes disposed at an exit end of the rocket engine combustion chamber and extending across an exit plane of the rocket engine combustion chamber. The plurality of adjustable airfoil vanes are distributed around a central longitudinal axis. The plurality of adjustable airfoil vanes and an inner perimeter of the rocket engine combustion chamber define a plurality of apertures between adjacent adjustable airfoil vanes at the exit plane. The plurality of apertures are configured to choke an exhaust exiting the rocket engine combustion chamber and cause the exhaust to expand supersonically along the plurality of adjustable airfoil vanes to create a supersonic jet. The rocket engine nozzle also includes an actuator configured to adjust a position of the plurality of adjustable airfoil vanes relative to each other to thereby direct the exhaust exiting the rocket engine combustion chamber as it expands supersonically along the plurality of adjustable airfoil vanes to thereby direct the supersonic jet and vector a thrust of the supersonic jet.

According to another aspect of the invention, a method of operating a rocket propulsion system includes providing a rocket engine. The rocket engine includes a rocket engine combustion chamber and a rocket engine nozzle. The rocket engine nozzle includes an aerospike. The aerospike includes a plurality of adjustable airfoil vanes disposed at an exit end of the rocket engine combustion chamber and extending across an exit plane of the rocket engine combustion chamber. The plurality of adjustable airfoil vanes are distributed around a central longitudinal axis. The plurality of adjustable airfoil vanes and an inner perimeter of the rocket engine combustion chamber define a plurality of apertures between adjacent adjustable airfoil vanes at the exit plane. The method also includes adjusting a position of one or more of the plurality of adjustable airfoil vanes relative to each other. The method then also includes operating the rocket engine such that an exhaust exits the rocket engine combustion chamber at the exit plane, is choked by the plurality of apertures, and expands supersonically along the plurality of airfoil vanes in their respective positions, thereby directing a supersonic jet and vectoring a thrust of the supersonic jet.

According to an embodiment of any paragraph(s) of this summary, the adjusting includes rotating one or more of the plurality of adjustable airfoil vanes around a respective radial axis on which the one or more adjustable airfoil vane is positioned.

According to another embodiment of any paragraph(s) of this summary, the adjusting includes translating one or more of the plurality of adjustable airfoil vanes linearly along a respective oblique axis. The respective oblique axis is perpendicular to a respective radial axis on which the one or more adjustable airfoil vane is positioned.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

According to a general embodiment a deflectable distributed aerospike rocket engine nozzle achieves the advantages of both an aerospike rocket nozzle and a jet vane control system. The rocket engine nozzle is configured to both choke and direct an exhaust exiting the rocket engine combustion chamber at the exit plane of the rocket engine combustion chamber before the exhaust expands supersonically across a plurality of adjustable airfoil vanes. As the exhaust is directed prior to being supersonically expanded along the airfoil vanes, no significant shockwave is imparted on the supersonic jet as is experienced in conventional systems. As a result, performance of the rocket engine may be improved over conventional systems in excess of 15%. The rocket engine nozzle also behaves as an aerospike. Accordingly, the rocket engine nozzle also achieves the advantages of improved thrust performance of the rocket engine across a wide range of altitudes while requiring less machine precision and achieving packing benefits over conventionally known rocket engine nozzles.

Figure 1:
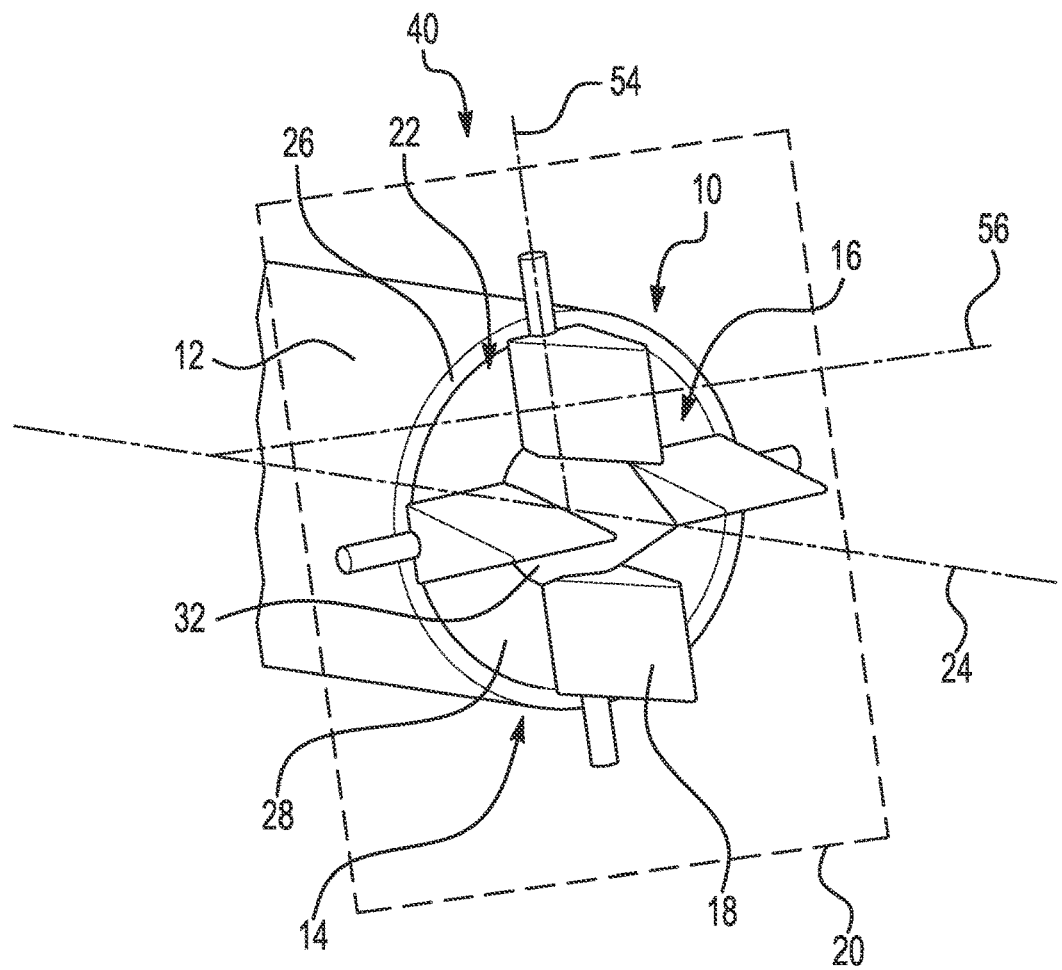
FIG. 1 is a perspective view of a deflectable distributed aerospike rocket engine nozzle.

Referring now to the figures, and initially to FIG. 1, an exemplary embodiment is depicted of a deflectable distributed aerospike rocket engine nozzle 10. The rocket engine nozzle 10 is manufacturable and applicable for use in a rocket engine 40 of (for example) a tactical missile. The rocket engine 40 includes a rocket engine combustion chamber 12 or rocket motor combustion chamber. The rocket engine nozzle 10 is disposed at an exit end 14 of the rocket engine combustion chamber 12. The rocket engine nozzle 10 includes an aerospike 16 having a configuration that achieves improved expansion and exit velocity of an exhaust exiting the combustion chamber 12, and having a reduced dimension compared to conventional bell nozzles. Specifically, the aerospike 16 includes at least one adjustable airfoil vane 18, or a plurality of adjustable airfoil vanes 18, disposed at the exit end 14 of the combustion chamber 12 and extending across an exit plane 20 of the combustion chamber 12. As illustrated in FIG. 1, the exit plane 20 is a plane that spans an exit opening 22 at the exit end 14 of the combustion chamber 12.

The plurality of adjustable airfoil vanes 18 are distributed around a central longitudinal axis 24 at the exit plane 20. For example, in an embodiment in which the combustion chamber is cylindrical, the plurality of adjustable airfoil vanes 18 may be distributed radially around the central longitudinal axis 24. Although in the illustrated embodiment the combustion chamber 12 is cylindrical and the exit opening 22 is circular, the combustion chamber 12 and exit opening 22 may be of different shapes and sizes, for example polygonal or otherwise non-axi-symmetric. In another embodiment, there may be multiple combustion chambers 12 wherein each of the plurality of adjustable airfoil vanes 18 are disposed at an exit plane 20 of each combustion chamber 12. Stated differently, each airfoil vane 18 may be designated to one combustion chamber 12. In any embodiment, the central longitudinal axis 24 is an axis that extends along a center line of the rocket motor combustion chamber 12 and is perpendicular to the exit plane 20 at a center point of the exit opening 22.

Figure 2:
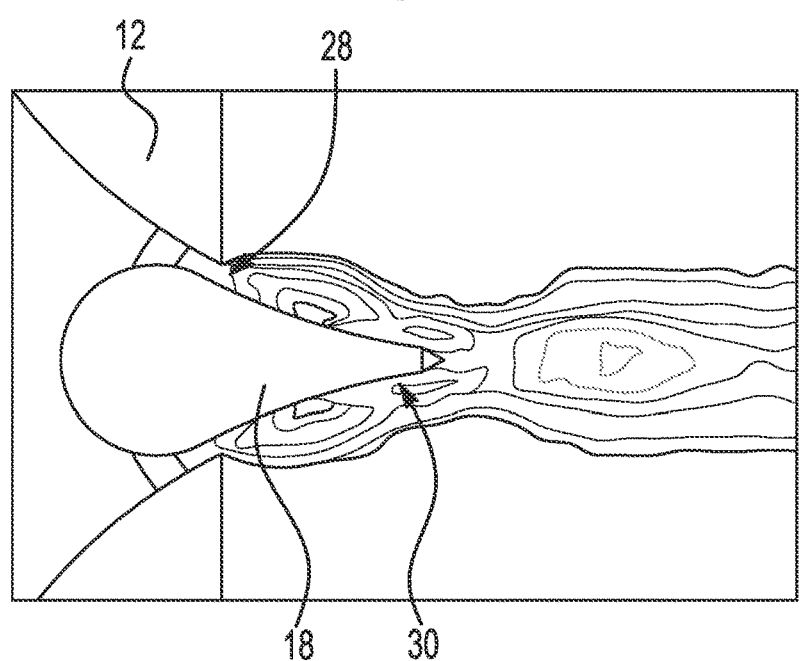
FIG. 2 is a simplified two-dimensional representation of supersonic expansion over an airfoil vane in a deflectable distributed aerospike rocket engine nozzle.

The plurality of adjustable airfoil vanes 18 and an inner perimeter 26 of the combustion chamber 12 at the exit opening 22 define a plurality of apertures 28 between adjacent airfoil vanes 18 at the exit plane 20. These apertures 28 act as a nozzle throat that chokes the exhaust as it exits the combustion chamber 12 at the exit plane 20, causing the exhaust to expand supersonically along the plurality of airfoil vanes 18. A simplified two-dimensional representation of such supersonic expansion over an airfoil vane 18 is depicted in FIG. 2. The supersonically expanded exhaust imparts a force on the aft surface 30 of each of the plurality of airfoil vanes 18, generating a supersonic jet that thrusts, or propels, the missile in a forward direction. As the plurality of airfoil vanes 18, and therefore the plurality of apertures 28 acting as the nozzle throat, are disposed at the exit plane 20 of the combustion chamber 12, the aerospike rocket nozzle 10 is configured for optimal expansion and thrust generation at a wide range of altitudes and ambient pressures.

The plurality of airfoil vanes 18 may include two or more distinct airfoil vanes 18. For example, in an embodiment the plurality of airfoil vanes 18 may include three distinct airfoil vanes 18. In the embodiment illustrated in FIG. 1, the plurality of airfoil vanes 18 include four distinct airfoil vanes 18. In another embodiment, the plurality of airfoil vanes 18 may include five or more distinct airfoil vanes 18.

The plurality of airfoil vanes 18 may be connected to a frame (not pictured) that structurally supports them, as well as the exit, or aft, end of the combustion chamber 12. Further, the aerospike 16 may include a central airfoil hub 32, to which each of the plurality of airfoil vanes 18 are adjustably connected and from which each of the plurality of airfoil vanes 18 extend radially outward. Each of the plurality of airfoil vanes 18 may be adjustably connected to the central airfoil hub 32 at the central longitudinal axis 24. The central airfoil hub 32 may be configured such that a maximum length of the central airfoil hub 32 is less than or equal to a maximum length of the plurality of airfoil vanes 18 in the longitudinal direction (the direction in which the longitudinal axis 24 extends). In this way, a majority of the exhaust exiting the exit end 14 of the combustion chamber 12 is configured to supersonically expand across the plurality of airfoil vanes 18 rather than the central airfoil hub 32. Therefore, the supersonic expansion created by the plurality of airfoil vanes 18 generates a majority of the thrust that propels the missile forward.

The aerospike 16, including the plurality of airfoil vanes 18 and the central airfoil hub 32, may be made of high temperature alloys such as titanium-zirconium-molybdenum (TZM), tungsten, carbon-carbon, or silica-filled ethylene propylene diene monomer (EPDM). The material thickness of the airfoil vanes 18 may be dependent on the specific implementation and environment in which they are to be used, such as whether they will be exposed to high temperatures, as this would affect the rate of erosion.

Figure 3:
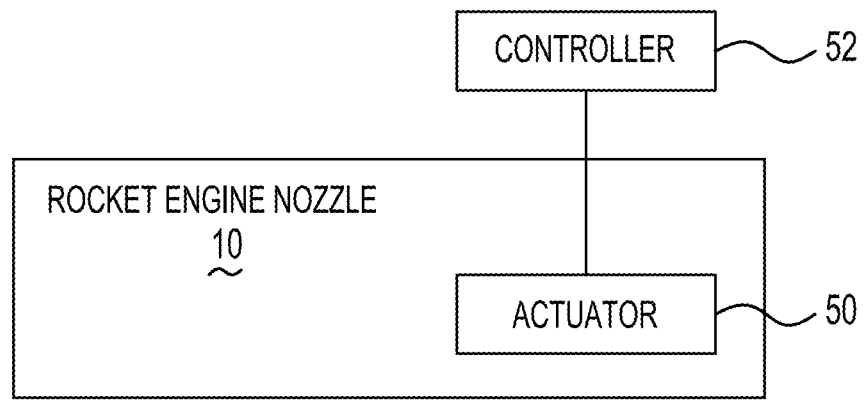
FIG. 3 is a schematic diagram of a deflectable distributed aerospike rocket engine nozzle.

Referring to FIG. 3, the rocket engine nozzle 10 includes an actuator 50 that is controlled by a controller 52. The controller 52 may be an integral part of the rocket engine nozzle 10 or may otherwise be independent and remote from the rocket engine nozzle 10. In either embodiment, the controller 52 communicates with the actuator 50 and is configured to carry out overall control of the functions and operations of the actuator 50. The controller 52 may be, for example, a central processing unit (CPU), microcontroller or microprocessor.

The controller 52 may be a programmable controller, suitably programmed to control the actuator 50 in a desired manner for a desired application. The actuator 50 may be configured to adjust the position of one or more of the plurality of adjustable airfoil vanes 18 relative to each other. The actuator 50 may adjust the position of the airfoil vanes 18 either independently from each other or otherwise in a coordinated manner, depending on the desired application.

Figure 4A:
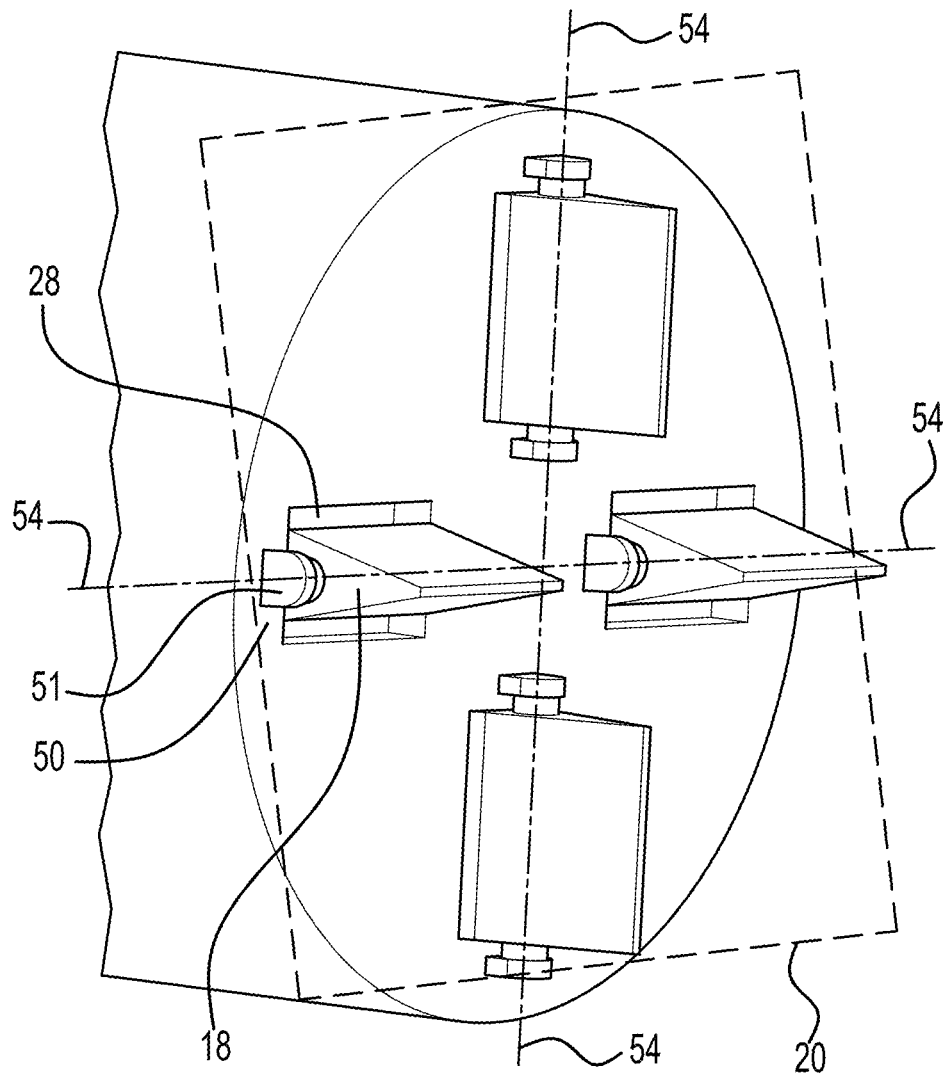
FIG. 4A is a perspective view of a deflectable distributed aerospike rocket engine nozzle according to one embodiment.

With reference to FIG. 4A, in an embodiment the actuator 50 may be configured to rotate one or more of the plurality of adjustable airfoil vanes 18 around a respective radial axis 54 on which the respective one or more adjustable airfoil vanes 18 are positioned. In this embodiment, the actuator 50 may include one or more actuation hinges 51 on the respective radial axis 54 on which the one or more adjustable airfoil vanes 18 are positioned. The actuation hinges 51 are configured to allow rotation of the one or more airfoil vanes 18 around their respective radial axis 54.

Figure 4B:
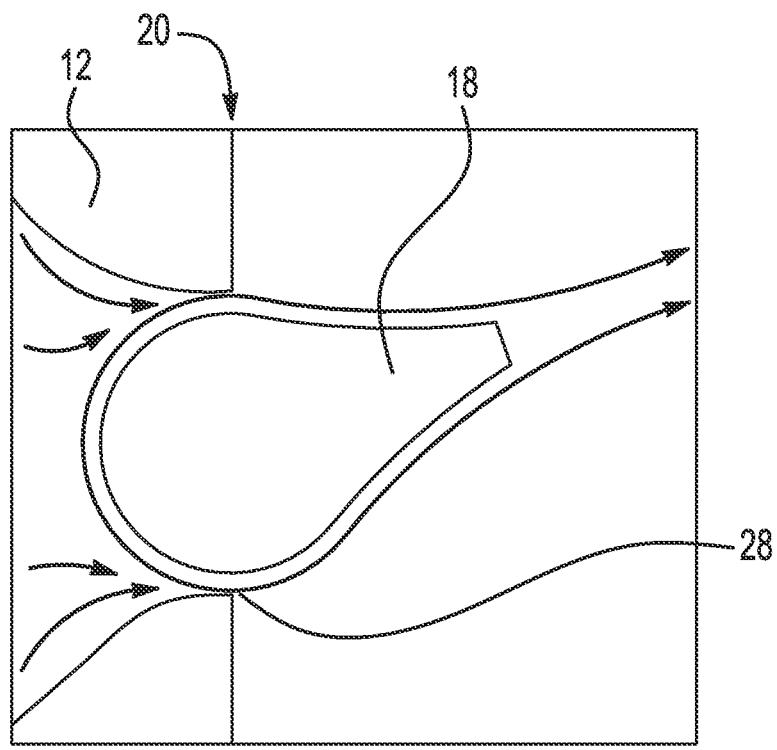
FIGS. 4B and 4C are simplified two-dimensional representations of supersonic expansion and vectored thrust in a deflectable distributed aerospike rocket engine nozzle according the embodiment of FIG. 4A.
Figure 4C:
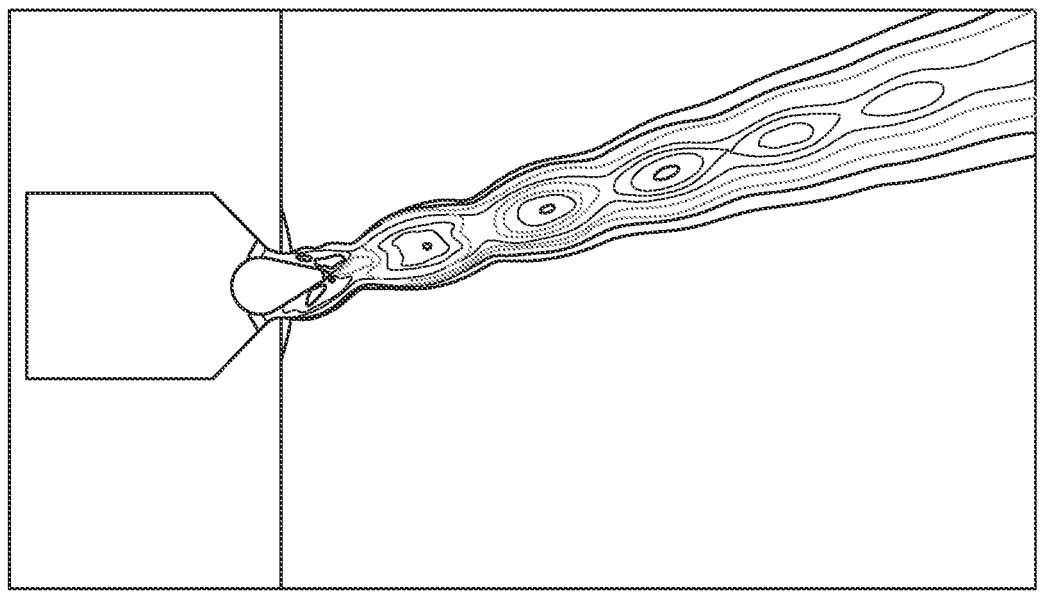

In this embodiment, as the exhaust exits the combustion chamber 12 at the exit plane 20, the exhaust will expand supersonically along each of the plurality of airfoil vanes 18 in their respective rotational position. Accordingly, the supersonic jet that is created will be aligned with each of the airfoil vanes 18 in their respective rotational position and the thrust will be vectored accordingly. A simplified two-dimensional representation of such vectored thrust based on a rotational position of an airfoil vane 18 is depicted in FIGS. 4B and 4C. The exhaust on an upstream end of the airfoil vane 18, being in a subsonic state, is isentropically redirected according to the rotational position of the airfoil vane 18 as it exits the combustion chamber 12 at the exit plane 20. The exhaust then expands supersonically along the airfoil vane 18 in its rotational position, creating a supersonic jet that is aligned with the airfoil vane 18 in its rotational position. As no interruption or redirection of the exhaust is provided after it expands supersonically, no shock is imparted on the supersonic jet.

Figure 5A:
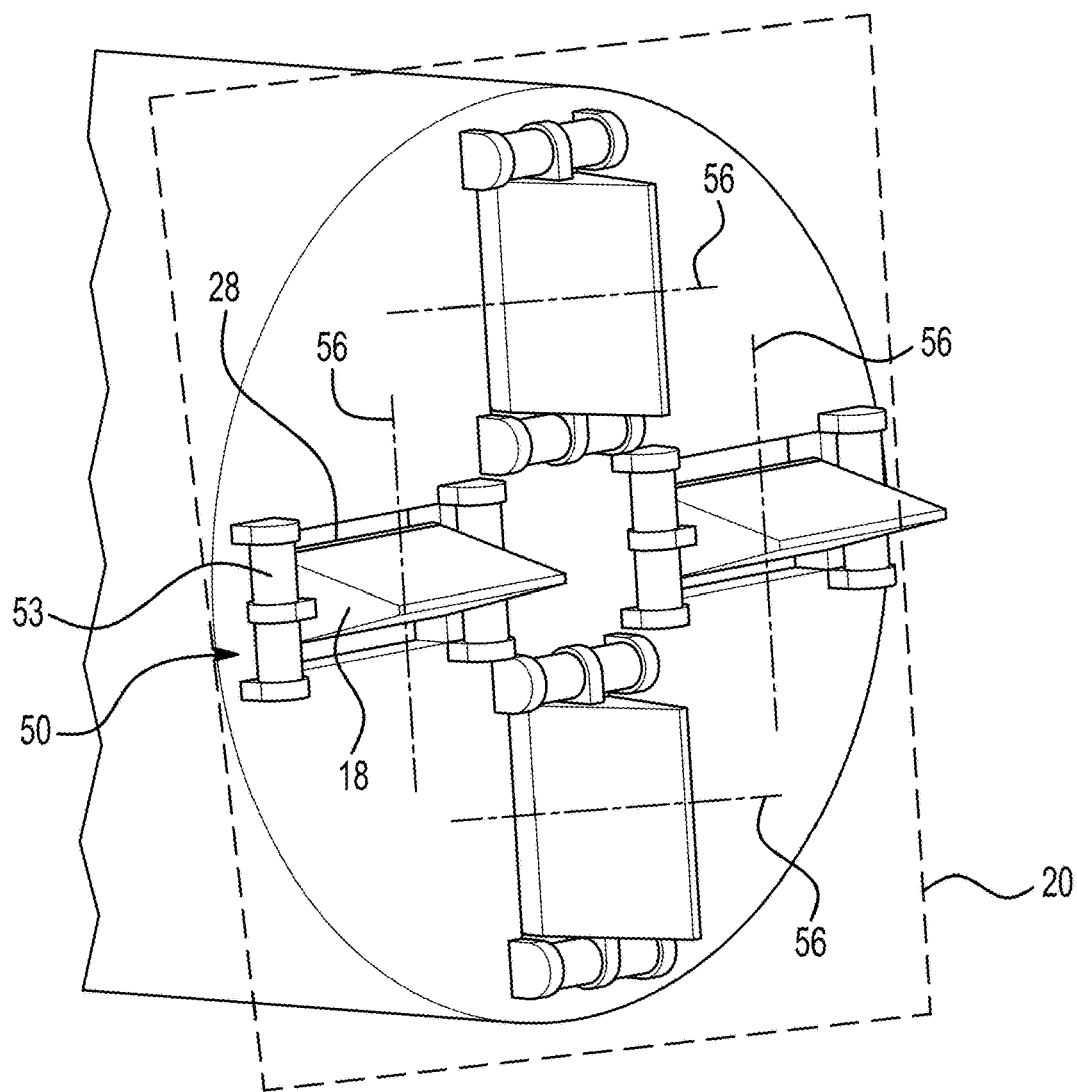
FIG. 5A is a perspective view of a deflectable distributed aerospike rocket engine nozzle according to another embodiment.

With reference to FIG. 5A, in another embodiment the actuator 50 may be configured to translate one or more of the plurality of adjustable airfoil vanes 18 linearly along respective oblique axes 56. The respective oblique axes 56 are perpendicular to respective radial axes 54 (FIG. 1) on which the one or more adjustable airfoil vanes 18 are respectively positioned. In this embodiment, the actuator 50 may include one or more linear actuators 53. The linear actuators 53 may be, for example, high-resolution linear actuators with stepper motors.

Figure 5B:
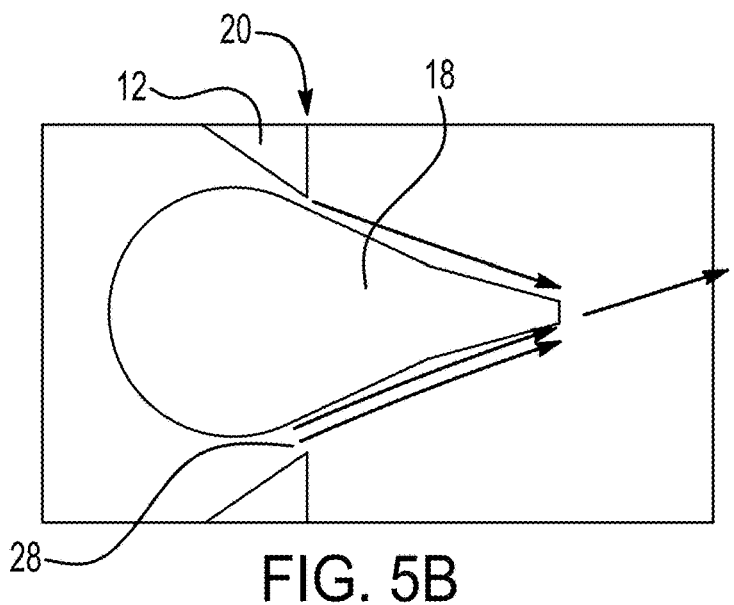
FIGS. 5B and 5C are simplified two-dimensional representations of supersonic expansion and vectored thrust in a deflectable distributed aerospike rocket engine nozzle according the embodiment of FIG. 5A.
Figure 5C:
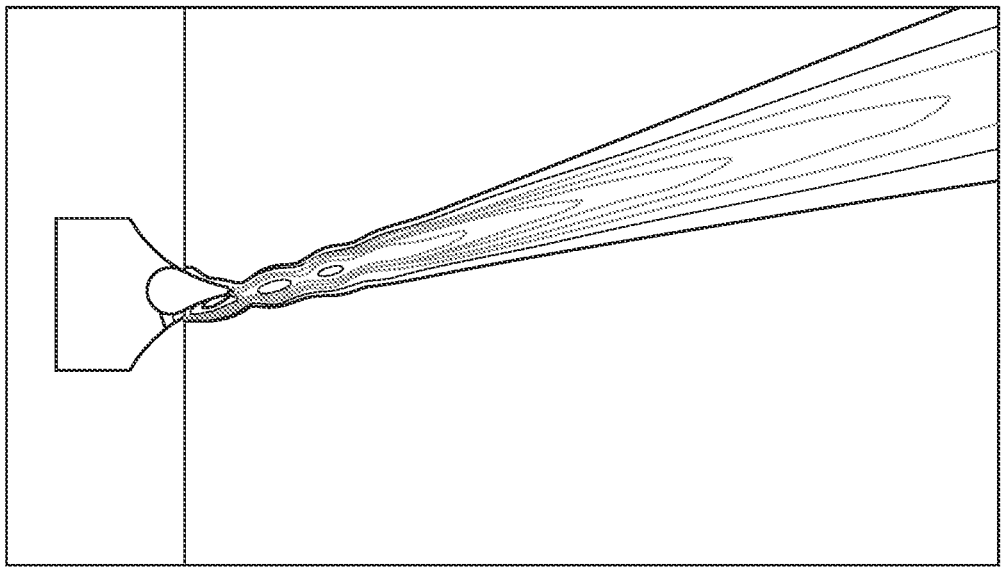

In this embodiment, when one or more of the airfoil vanes 18 are translated linearly, their position relative to each other will adjust and therefore, the size and shape of the apertures 28 formed between adjacent airfoil vanes 28 will adjust accordingly. For example, as one or more of the airfoil vanes 18 are translated linearly, the resulting size and shape of the apertures 28 may be asymmetric relative to each other. Therefore, in operation, a mass of the exhaust exiting the rocket engine combustion chamber 12 through each aperture 28 on either side of an airfoil vane 18 may vary based on the respective sizes and shapes of the apertures 28. Stated differently, the cross-sectional area of the choke point on either side of each of the airfoil vanes 18 will change, thus modulating mass flow rate and therefore thrust, thereby producing a net vector. A simplified two-dimensional representation of such differential exhaust mass on either side of an airfoil vane 18 is depicted in FIGS. 5B and 5C. When one aperture 28 is larger than another on either side of an airfoil vane 18, the mass of the exhaust exiting the rocket engine combustion chamber 12 through the larger aperture 28 will be greater than the mass of the exhaust exiting the rocket engine combustion chamber 12 through the smaller aperture 28. As the exhaust on both sides of the airfoil vane 18 expands supersonically along the airfoil vane 18 and converges, a non-zero thrust vector angle will result. That is, the supersonic jet that that is created will be aligned with the net exhaust direction of the differential converging exhaust masses exiting and expanding supersonically along the airfoil vane 18 on either side of the airfoil vane 18. Again, as no interruption or redirection of the supersonic jet is provided thereafter, no shock is imparted on the supersonic jet.

Figure 6:
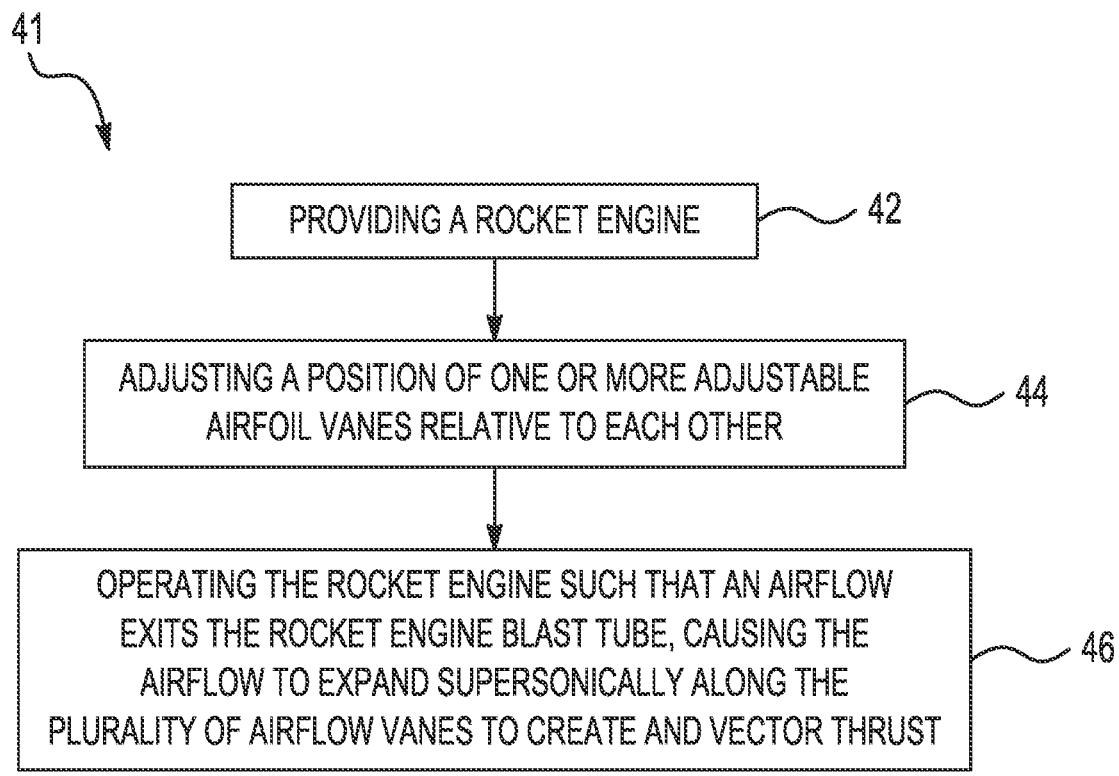
FIG. 6 is a flowchart of a method of operating a rocket engine.

With reference to FIG. 6, a method 41 of operating a rocket propulsion system is depicted. In step 42 the method includes providing a rocket engine. The rocket engine has a rocket engine combustion chamber and a rocket engine nozzle. The rocket engine combustion chamber may be cylindrical. The rocket engine nozzle includes an aerospike having a plurality of airfoil vanes disposed at an exit end of a rocket engine combustion chamber and extending across an exit plane of the rocket engine combustion chamber. The plurality of airfoil vanes are distributed radially around a central longitudinal axis, the central longitudinal axis being an axis that extends along a center line of the rocket motor combustion chamber, perpendicular to the exit plane at a center point of an exit opening at the exit plane.

In an embodiment, the aerospike may further include a central airfoil hub from which each of the plurality of airfoil vanes extend radially outward. A maximum length of the central airfoil hub in a longitudinal direction (the direction in which the longitudinal axis extends) is less than or equal to a maximum length of the plurality of airfoil vanes in the longitudinal direction.

The plurality of airfoil vanes may include three airfoil vanes, four airfoil vanes, or five or more airfoil vanes. The plurality of airfoil vanes may be adjustably connected to the exit end of the rocket engine combustion chamber at the exit plane of the rocket engine combustion chamber. In any embodiment, the plurality of airfoil vanes and an inner perimeter of the rocket engine combustion chamber define a plurality of apertures between adjacent airfoil vanes at the exit plane.

The method then includes, at step 44, adjusting a position of one or more of the plurality of adjustable airfoil vanes relative to each other. For example, the adjusting may include rotating one or more of the plurality of airfoil vanes around a respective radial axis on which the one or more adjustable airfoil vane is positioned. In another embodiment, the adjusting may include translating one or more of the plurality of adjustable airfoil vanes linearly along a respective oblique axis. The respective oblique axis is perpendicular to a respective radial axis on which the one or more adjustable airfoil vane is positioned.

The method then includes, in step 46, operating the rocket engine such that an exhaust exits the rocket engine combustion chamber at the exit plane, is choked by the plurality of apertures, and expands supersonically along the plurality of airfoil vanes in their respective positions, thereby directing a supersonic jet and vectoring a thrust of the supersonic jet.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket engine nozzle comprising:
an aerospike including a plurality of adjustable airfoil vanes disposed at an exit end of a rocket engine combustion chamber and extending across a circular exit opening of the rocket engine combustion chamber at the exit end of the rocket engine combustion chamber from a first point on an inner perimeter of the rocket engine combustion chamber at the exit end to a second point on the inner perimeter of the rocket engine combustion chamber at the exit end, the plurality of adjustable airfoil vanes being distributed around a central longitudinal axis, the plurality of adjustable airfoil vanes and the inner perimeter of the rocket engine combustion chamber at the exit end defining a plurality of apertures between adjacent adjustable airfoil vanes at the exit opening, the plurality of apertures being configured to choke an exhaust exiting the rocket engine combustion chamber and cause the exhaust to expand supersonically along the plurality of adjustable airfoil vanes to create a supersonic jet; and
an actuator configured to adjust a position of the plurality of adjustable airfoil vanes relative to each other to thereby direct the exhaust exiting the rocket engine combustion chamber as the exhaust expands supersonically along the plurality of adjustable airfoil vanes to thereby direct the supersonic jet and vector a thrust of the supersonic jet.

2. The rocket engine nozzle according to claim 1, wherein the actuator is configured to rotate one or more of the plurality of adjustable airfoil vanes around a respective radial axis on which the one or more of the plurality of adjustable airfoil vane is positioned.

3. The rocket ending nozzle according to claim 1, wherein the actuator includes one or more actuation hinges.

4. The rocket engine nozzle according to claim 1, wherein the actuator is configured to translate one or more of the plurality of adjustable airfoil vanes linearly along a respective oblique axis, the respective oblique axis being perpendicular to a respective radial axis on which the one or more adjustable airfoil vane is positioned.

5. The rocket engine nozzle according to claim 1, wherein the actuator includes one or more linear actuators.

6. The rocket engine nozzle according to claim 1, wherein the plurality of adjustable airfoil vanes include four adjustable airfoil vanes.

7. The rocket engine nozzle according to claim 1, wherein the actuator is configured to adjust each of the plurality of adjustable airfoil vanes independently from each other.

8. The rocket engine nozzle according to claim 1, wherein the actuator is configured to adjust one or more of the plurality of airfoil vanes in a coordinated manner.

9. A rocket engine comprising:
a rocket engine combustion chamber; and
a rocket engine nozzle including:
an aerospike including a plurality of adjustable airfoil vanes disposed at an exit end of the rocket engine combustion chamber and extending across a circular exit opening of the rocket engine combustion chamber at the exit end of the rocket engine combustion chamber from a first point on an inner perimeter of the rocket engine combustion chamber at the exit end to a second point on the inner perimeter of the rocket engine combustion chamber at the exit end, the plurality of adjustable airfoil vanes being distributed around a central longitudinal axis, the plurality of adjustable airfoil vanes and the inner perimeter of the rocket engine combustion chamber at the exit end defining a plurality of apertures between adjacent adjustable airfoil vanes at the exit opening, the plurality of apertures being configured to choke an exhaust exiting the rocket engine combustion chamber and cause the exhaust to expand supersonically along the plurality of adjustable airfoil vanes to create a supersonic jet; and an actuator configured to adjust a position of the plurality of adjustable airfoil vanes relative to each other to thereby direct the exhaust exiting the rocket engine combustion chamber as the exhaust expands supersonically along the plurality of adjustable airfoil vanes to thereby direct the supersonic jet and vector a thrust of the supersonic jet.

10. The rocket engine according to claim 9, wherein the actuator is configured to rotate one or more of the plurality of adjustable airfoil vanes around a respective radial axis on which the one or more of the plurality of adjustable airfoil vane is positioned.

11. The rocket engine according to claim 9, wherein the actuator includes one or more actuation hinges.

12. The rocket engine according to claim 9, wherein the actuator is configured to translate one or more of the plurality of adjustable airfoil vanes linearly along a respective oblique axis, the respective oblique axis being perpendicular to a respective radial axis on which the one or more adjustable airfoil vane is positioned.

13. The rocket engine according to claim 9, wherein the actuator includes one or more linear actuators.

14. The rocket engine according to claim 9, wherein the plurality of adjustable airfoil vanes include four adjustable airfoil vanes.

15. The rocket engine according to claim 9, wherein the actuator is configured to adjust each of the plurality of adjustable airfoil vanes independently from each other.

16. The rocket engine according to claim 9, wherein the actuator is configured to adjust one or more of the plurality of airfoil vanes in a coordinated manner.

17. A method of operating a rocket propulsion system, the method comprising:
providing a rocket engine, the rocket engine including a rocket engine combustion chamber and a rocket engine nozzle, the rocket engine nozzle including an aerospike including a plurality of adjustable airfoil vanes disposed at an exit end of the rocket engine combustion chamber and extending across a circular exit opening of the rocket engine combustion chamber at the exit end of the rocket engine combustion chamber from a first point on an inner perimeter of the rocket engine combustion chamber at the exit end to a second point on the inner perimeter of the rocket engine combustion chamber at the exit end, the plurality of adjustable airfoil vanes being distributed around a central longitudinal axis, the plurality of adjustable airfoil vanes and the inner perimeter of the rocket engine combustion chamber at the exit end defining a plurality of apertures between adjacent adjustable airfoil vanes at the exit opening, the plurality of apertures being configured to choke an exhaust exiting the rocket engine combustion chamber and cause the exhaust to expand supersonically along the plurality of adjustable airfoil vanes to create a supersonic jet; an actuator configured to adjust a position of the plurality of adjustable airfoil vanes relative to each other to thereby direct the exhaust exiting the rocket engine combustion chamber as the exhaust expands supersonically along the plurality of adjustable airfoil vanes to thereby direct the supersonic jet and vector a thrust of the supersonic jet, the method further comprising adjusting a position of one or more of the plurality of adjustable airfoil vanes relative to each other; and operating the rocket engine such that the exhaust exits the rocket engine combustion chamber at the exit plane and the exhaust is choked by the plurality of apertures and expands supersonically along the plurality of airfoil vanes in their respective positions thereby directing the supersonic jet and vectoring the thrust of the supersonic jet.

18. The method according to claim 17, wherein the adjusting includes rotating the one or more of the plurality of adjustable airfoil vanes around a respective radial axis on which the one or more adjustable airfoil vane is positioned.

19. The method according to claim 17, wherein the adjusting includes translating the one or more of the plurality of adjustable airfoil vanes linearly along a respective oblique axis, the respective oblique axis being perpendicular to a respective radial axis on which the one or more adjustable airfoil vane is positioned.

* * * * *